Oct. 4, 1960     T. MATIN     2,954,629
NON-ROTATABLE ADVERTISING PLATE FOR A MOTOR VEHICLE HUB CAP
Filed Dec. 12, 1958
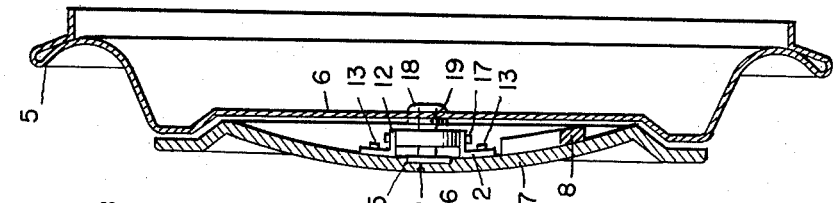
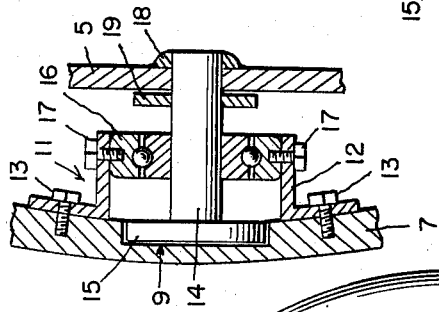
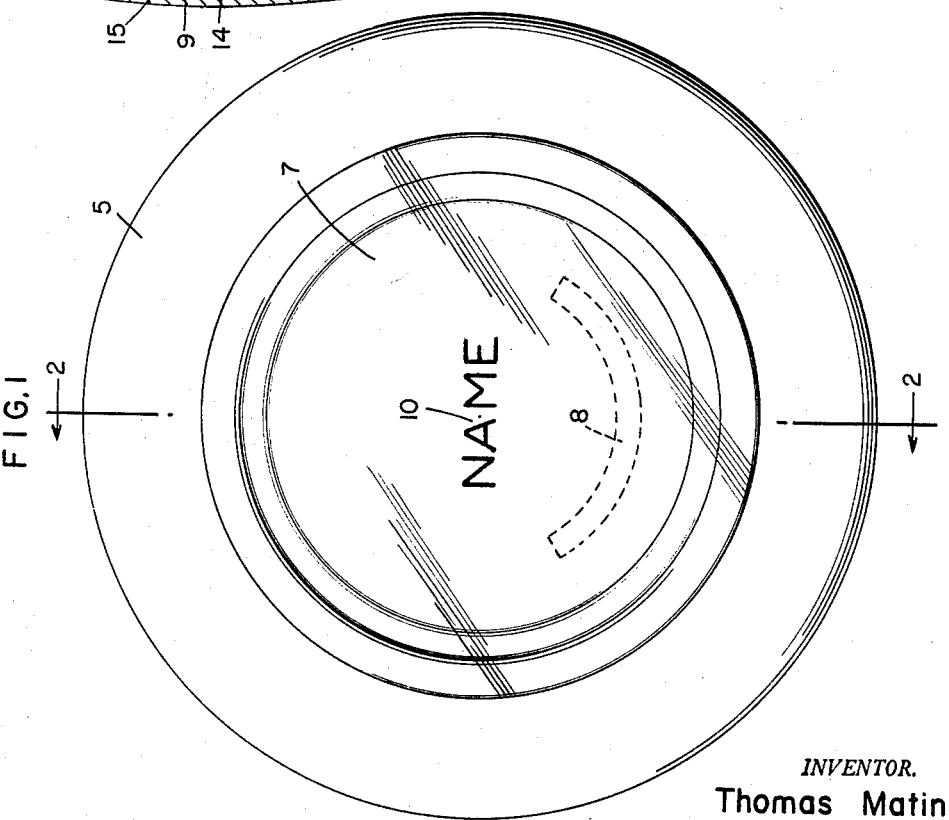
INVENTOR.
Thomas Matin
BY
Garvey + Garvey
ATTYS

United States Patent Office 2,954,629
Patented Oct. 4, 1960

2,954,629

NON-ROTATABLE ADVERTISING PLATE FOR A MOTOR VEHICLE HUB CAP

Thomas Matin, 100 Sunset Blvd., Perth Amboy, N.J.

Filed Dec. 12, 1958, Ser. No. 779,942

1 Claim. (Cl. 40—129)

This invention is a non-rotatable advertising plate for a motor vehicle hub cap wherein the plate is separate from the cap but attached to the plate in a manner to permit the cap to rotate with the vehicle wheel while the plate is held substantially stationary. Attempts have been made in the art to accomplish this result, illustrative of which are the patents to Walker No. 2,111,015, March 15, 1938 and Ball et al. No. 2,130,220, September 13, 1938, which have failed to be commercially adopted.

Objects of this invention are to provide a non-rotatable advertising place which lends itself for ready adaption on conventional hub caps of present day motor vehicles; to provide a self contained name plate and attaching assembly which may be secured to the hub caps quickly and with facility; to provide an attaching assembly for the name plate which has no frictional contact with the latter; and to provide a name plate and attaching assembly adapted to be united to the hub cap omitting the necessity of threaded bolts and nuts.

Other objects of the invention will be manifest from the following description of the present preferred form of the invention, taken in connection with the accompanying drawing, wherein Fig. 1 is an elevational view of the non-rotatable advertising plate of the present invention illustrating its application on a conventional hub cap;

Fig. 2 is a vertical sectional view of the same taken on the line 2—2 of Fig. 1 looking in the direction of the arrows; and Fig. 3 is a detailed and large fragmentary sectional view of the name plate attaching assembly and hub cap in engaged position.

To illustrate the application of the present invention a conventional motor vehicle wheel hub cap 5 is shown which is adapted for attachment to the wheel in a manner well-known in the art. The cap includes a central discal portion 6 which may be counter-sunk, as shown in Fig. 1, or which may consist of a bar formed integral with or detachably secured to the hub cap.

The name plate of the present invention is illustrated at 7 and includes a weight 8 for the purpose hereinafter described. The name plate may be of any desired shape and size but, in the present instance, is shown to be circular and of a contour generally conforming to the central contour of a conventional hub cap. The plate is provided with a central recess 9, as shown in Figs. 2 and 3. The outer face of the name plate is adapted to carry indicia 10 which may be the name of the car upon which the plate is mounted or any other suitable advertising.

The attaching assembly for the name plate is generally designated 11 and includes right angle brackets 12 mounted on opposite sides of the recess 9, the brackets being detachably engaged with the inner face of the name plate 7 by screw bolts 13. The assembly further includes a shaft 14, one end of which carries a head 15 which is loosely mounted in the recess 9. The shank of the shaft 14 is rotatably mounted in an anti-friction bearing 16, the latter being secured to the brackets 12 by threaded bolts 17. The anti-friction bearing 16, in the present instance, is shown to consist of an outer stationary part and an inner movable part which are secured to the shaft 14 having ball bearings mounted in complemental races in the adjacent faces of said inner and outer member, as shown to advantage in Fig. 3.

In attaching the name plate 7 to the hub cap 5 the inner end of the shaft 14 extends through a complemental opening in the cap to a point where the terminal of the free end protrudes beyond the inner face of the cap to which it is welded, as indicated at 18. If desired, the free end of the shaft 14 may be secured by a conventional jamb nut. A washer 19 is secured to the shank of the shaft 14 on the outside of the hub cap, also as illustrated to advantage in Fig. 3.

In use of this device when the hub cap 5 rotates with the wheel the shaft 14 correspondingly rotates during which cycle the name plate 7 remains substantially stationary by reason of the weight 8. It is obvious that the hub cap 5 may be removed in the usual manner in conjunction with the name plate and attaching assembly.

Although the present invention has been shown and described in its present preferred form, it is nevertheless to be understood that various changes may be made therein, without departing from the scope of the appended claim.

What I claim is:

A non-rotatable advertising plate attachment for a motor vehicle hub cap comprising a name plate, a portion of the name plate being weighted to retain said plate substantially stationary during rotation of the hub cap, the inner face of the name plate being provided with a central recess, indicia on the outer face of said name plate, and an attaching assembly for connecting said name plate to the hub cap, said attaching assembly including mounting brackets fixed to the inner face of said name plate proximate the central recess thereof, a shaft, a head on one end of the shaft loosely mounted in the central recess of the name plate, a ball bearing raceway secured to said brackets, a complemental raceway fixed to said shaft, and ball bearings in said raceways, the free end of said shaft extending through a complemental opening in the hub cap, the attachment further including means for securing said shaft to the hub cap.

References Cited in the file of this patent

UNITED STATES PATENTS

| | | |
|---|---|---|
| 1,501,094 | Braucher | July 15, 1924 |
| 1,522,904 | Pack et al. | Jan. 13, 1925 |
| 1,644,339 | Kalatzky | Oct. 4, 1927 |
| 1,699,831 | Braucher | Jan. 22, 1929 |